B. H. DICKSON AND J. E. FRY.
STOVE.
APPLICATION FILED MAR. 1, 1919.
1,343,122. Patented June 8, 1920.
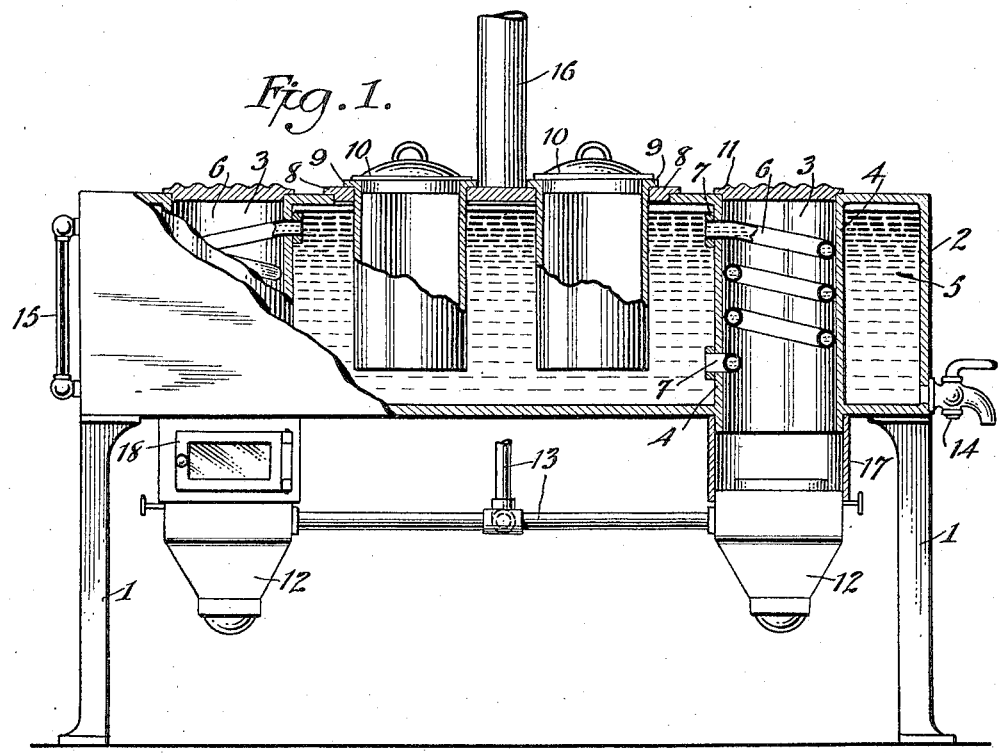
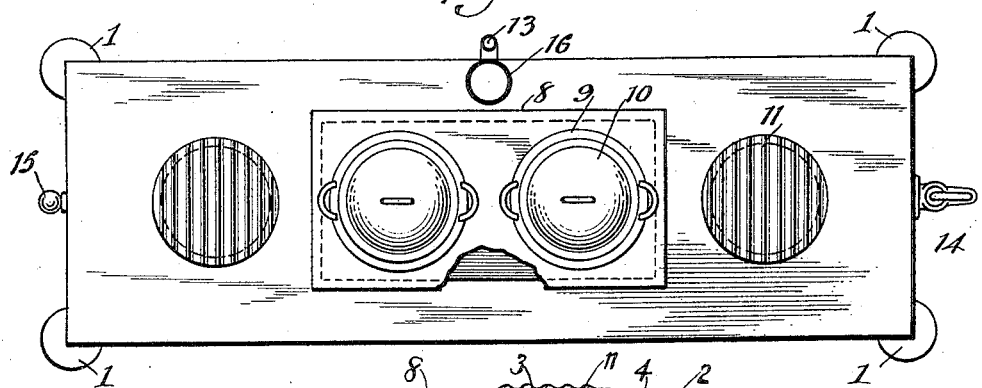
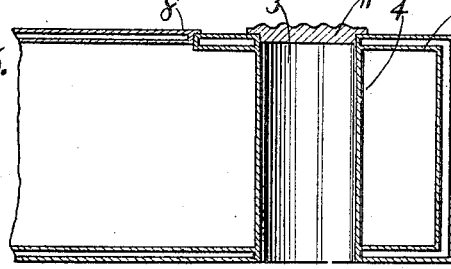
WITNESSES
A. R. Appleman
E. B. Gale
INVENTORS
Jesse E. Fry
Benjamin H. Dickson
BY
ATTORNEYS

UNITED STATES PATENT OFFICE.

BENJAMIN HARRISON DICKSON AND JESSE EDWARD FRY, OF YUMA, COLORADO.

STOVE.

1,343,122.	Specification of Letters Patent.	Patented June 8, 1920.

Application filed March 1, 1919. Serial No. 280,112.

*To all whom it may concern:*

Be it known that we, BENJAMIN H. DICKSON and JESSE E. FRY, citizens of the United States, residing at Yuma, in the county of Yuma and State of Colorado, have invented a new and Improved Stove, of which the following is a full, clear, and exact description.

This invention relates to a new and improved stove, more particularly adapted for use in connection with a vapor burner.

One of the objects of the invention is to provide a stove wherein, by a compact and novel arrangement and combination of parts, a stove is provided which more effectively utilizes the heat given by the burning fuel and so effecting a substantial economy in the use thereof.

A further object is to furnish a stove which serves to function as a cooking unit wherein the dry heat of a burner is directly used for this purpose, and also functions as an efficient hot-water heater, wherein the water in the main reservoir is directly heated by the walls of a heating chamber extending therethrough; and in addition there is provided within said chamber an auxiliary heating coil which communicates with said reservoir and effectively utilizes the heat from the burner at all times. There is also provided an additional means for cooking, which includes a receptacle arranged in the reservoir. In this manner the hot water is utilized to furnish the required heat for cooking. A very desirable feature of this is that food may be started on the dry burner and, after a sufficient length of time, when the water is sufficiently heated, the flame may be extinguished and the food placed in the receptacle in the reservoir, where the cooking may continue without using any further fuel. It is thus apparent that with this novel arrangement and combination, it serves to function as a fireless cooker.

Other objects and advantages will appear from the accompanying drawings and description.

In the drawings, similar characters of reference indicate corresponding parts in the several views.

Figure 1 is a broken cross section showing the arrangement of the various parts of the stove; and Fig. 2 is a plan view showing the arrangement of the covers, receptacles and openings in the top thereof.

Fig. 3 is a broken sectional view showing the stove covered by a heat insulating means.

In the preferred construction shown, the reservoir 2, which may be composed of any suitable metal, is rectangular in form and mounted on supports 1. Extending through each end of said reservoir are heating or cooking chambers 3 having walls 4 which contact on all sides with the liquid 5 in the reservoir. A coil of pipe 6 is disposed within the heating chamber and is shown with its ends extending through openings 7 in the wall of the chamber so that said coil may communicate with said reservoir and act as an auxiliary heating means whereby the contents may be heated.

For the top of the reservoir there is provided a removable cover 8 with suitable openings therein to receive cooking receptacles 9 provided with covers 10, which receptacles extend into the reservoir and serve to hold food which may be placed therein. A corrugated lid 11 is provided at the upper part of the heating chamber. At the lower portion of said chamber there is provided a heating means 12, which in this case is a vapor burner having fuel-supply pipes 13 leading thereto.

As a means of drawing water from the reservoir, there is provided an outlet and faucet 14. As a means for determining the height of water in the reservoir, there is provided a water gage 15. An outlet 16 is provided which serves to carry off an excess of steam if such is formed within the reservoir. A flue 17 leads from burner 12 to heating chamber 3, and has a door 18 therein.

From the above described arrangement it is seen that one burner acts as a source of heat either for cooking directly by the dry heat therefrom, or by cooking in an independent receptacle by the hot water surrounding same, which water in turn has been heated by the heating chamber and the auxiliary heating means disposed within said chamber and connected so that the water in said reservoir may circulate through said means. The above is accomplished without a separate burner to heat the independent receptacle, thus utilizing the one burner to heat the respective cooking receptacles under the conditions above mentioned.

It may be further desirable that the reservoir be covered with a heat insulating material to conserve or hold the heat therein, and so better function as a fireless cooker. A vacuum chamber is shown in Fig. 3, but any suitable heat insulating material may be employed.

We claim:

1. In a stove, the combination of a hot-water reservoir having an opening therein, a receptacle extending within said opening, a heating chamber extending through the reservoir, and an auxiliary heating means within said chamber and communicating with said reservoir, so that the circulating liquid passing through the auxiliary heating means comes in direct contact with the walls of the heating chamber, whereby food may be cooked from heat in the heating chamber, and other food placed in the receptacle may be heated from the hot water in the reservoir, the stove thus functioning as a heater, and a fireless cooker.

2. In a stove, the combination of a means for dry cooking, comprising a burner and a heating chamber, a water reservoir surrounding said chamber and heated thereby, a receptacle for said water reservoir, and an auxiliary water-heating means within said chamber and connected with said reservoir, said chamber having an opening at the top thereof, and adapted to receive a receptacle, whereby food placed in said last named receptacle may be cooked from the dry heat burner, and food placed in said first named receptacle may be heated from the water of reservoir.

3. In a stove of the character described, a reservoir having an opening in the top thereof, a cover for said opening provided with an opening adapted to receive a cooking receptacle, a receptacle for said opening and extending into said reservoir, a heating chamber extending through said reservoir, a lid therefor, and auxiliary water-heating means comprising a coil of pipe within said heating chamber and connected with said reservoir, whereby food may be cooked from the dry heat from the heating chamber, and other food placed in the cooking receptacle within the reservoir, may be heated from the water in the reservoir.

4. In a stove, the combination of a water reservoir, a heating chamber extending therethrough, a burner for said heating chamber, said heating chamber surrounded by the water of said reservoir, an auxiliary heating coil within said chamber and communicating with said reservoir, and a cooking receptacle within said reservoir, whereby food placed in said receptacle may be cooked by the heat from the water in the reservoir, the said water in turn being heated by the transmission of heat thereto from the walls of the chamber, and the auxiliary heating coil within said chamber.

5. In a stove, a reservoir having a receptacle receiving opening in the top thereof, a receptacle fitting said opening extending into said reservoir, a heating chamber extending therethrough, means for heating said chamber, and an auxiliary hot water heating means disposed within the said chamber, whereby food placed in said receptacle is cooked by the heat from the water in the reservoir, the said water in turn having heat transmitted thereto through the walls of said heating chamber, and the auxiliary hot water heating means disposed within the chamber.

6. In a stove, a hot water reservoir, a heating chamber extending through each end thereof, said chamber having an opening at the top adapted to receive a cooking receptacle, a burner for each of said chambers, and an auxiliary heating coil in each of said chambers communicating with said reservoir, and receptacles projecting within said reservoir adjacent to said heating chambers, whereby food placed in the last named receptacle may be cooked as in a fireless cooker, and other food placed in said first named receptacle may be cooked from the dry heat from the heating chamber, the water in the reservoir receiving its heat through the walls of the heating chamber, and the auxiliary heating coil.

BENJAMIN HARRISON DICKSON.
JESSE EDWARD FRY.